June 16, 1942.   S. MANDL   2,286,917
RATCHET SOCKET
Filed May 3, 1941
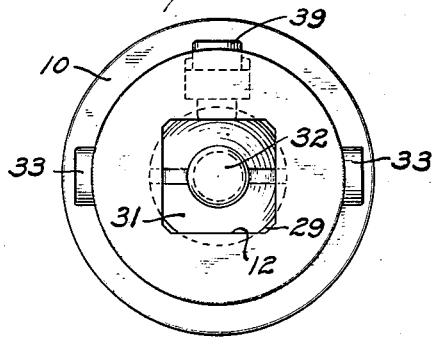
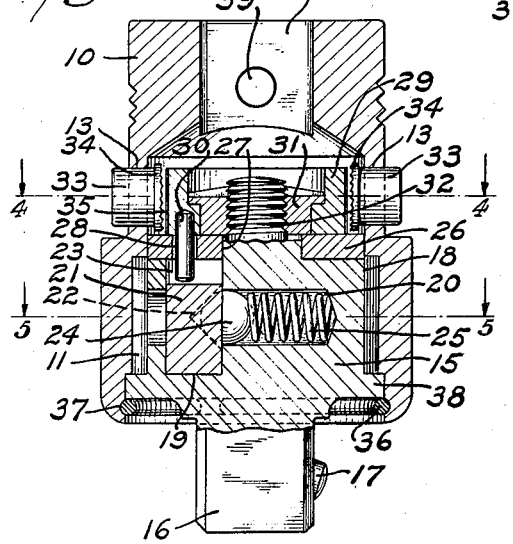
INVENTOR.
Siegmund Mandl
BY Lieber & Lieber
ATTORNEYS.

Patented June 16, 1942

2,286,917

UNITED STATES PATENT OFFICE 2,286,917

RATCHET SOCKET

Siegmund Mandl, Milwaukee, Wis., assignor to Blackhawk Mfg. Co., Milwaukee, Wis., a corporation of Wisconsin Application May 3, 1941, Serial No. 391,674

9 Claims. (Cl. 192—43.2)

The present invention relates generally to improvements in rotary motion transmitting and reversing mechanism, and relates more specifically to improvements in the construction and operation of ratchet socket assemblages which are adapted to be interposed as transmission couplings between driving and driven elements.

An object of the invention is to provide a simple, compact and readily reversible ratchet socket assemblage which is adapted to be interposed as a rotary motion transmitting coupling between a driving and a driven element.

In my copending application Serial No. 314,435, filed January 18, 1940, is shown an improved ratchet mechanism comprising generally an annular internally toothed head having a manipulating or driving lever formed integral therewith, a driven member rotatable within the annular series of internal teeth of the head and having an integral work engaging shank projecting externally of the driving head, a dog slidable upon the driven member and having positioning detents therein, a spring pressed ball coacting with the dog detents to retain the dog in adjusted position, and a manually operable adjusting ring cooperable with the dog to reverse the action of the ratchet. While this improved oscillatory ratchet mechanism is entirely satisfactory and has gone into extensive successful commercial use, it is frequently desirable to omit the integral driving lever and to utilize the reversible ratchet or motion transmitting mechanism in a rotary coupling unit which may be interposed between the work and other types of oscillatory or continuously rotary driving elements. Such a coupling unit must be relatively sturdy and compact, readily manipulable for application to the work and for reversal of the ratchet action, and should also effectively conceal and protect the rather delicate ratchet mechanism while also permitting convenient access to the ratchet for inspection purposes.

It is therefore a more specific object of my present invention, to provide an improved coupling unit having such ratchet mechanism embodied therein, and which meets all of the above-mentioned special requirements.

Another specific object of this invention is to provide an improved motion transmitting socket which is adapted to transmit either oscillatory or continuous rotation of a driver to a driven element in either a forward or a reverse direction.

A further specific object of the invention is to provide an improved ratchet socket or coupling unit, which is extremely durable and compact in structure, and wherein the ratchet mechanism is amply concealed and protected while also being quickly and conveniently reversible.

Still another specific object of the present invention is to provide an improved ratchet coupling which may be readily constructed, assembled and dismantled, and which may be manufactured and sold at moderate cost.

These and other specific objects and advantages of the invention will be apparent from the following more detailed description.

A clear conception of an embodiment of the present invention, and of the mode of constructing and of utilizing reversible ratchet socket assemblages manufactured in accordance with the improvement, may be had by referring to the drawing accompanying and forming a part of this specification wherein like reference characters designate the same or similar parts in the several views.

Fig. 1 is a central longitudinal section through one of the improved reversible ratchet coupling units;

Fig. 2 is a top view of the assembled unit;

Fig. 3 is a bottom view of the improved assemblage;

Fig. 4 is a transverse section through the unit, taken along the line 4—4 of Fig. 1; and Fig. 5 is another transverse section through the assemblage, taken along the line 5—5 of Fig. 1.

While the invention has been shown and described herein as being specifically embodied in a reversible ratchet coupling unit having ratchet mechanism of the specific type shown in my prior application, it is not my desire or intention to thereby unnecessarily restrict the scope or utility of the present improvement.

Referring to the drawing, the improved ratchet coupling assemblage shown therein by way of illustration, comprises in general a one-piece annular driving housing or coupling casing 10 having a circular series of internal V-shaped teeth 11 therein, and also being provided with a polygonal central end socket 12, and with radial diametrically opposite medial openings 13 located between the teeth 11 and socket 12; a driven work engaging member 15 having an integral polygonal shank 16 provided with a snap latch 17 and projecting outwardly beyond the housing casing 10, the member 15 also having a cylindrical medial portion 18 disposable within the annular series of teeth 11 and being provided with a transverse slot 19 and with a central recess 20 extending perpendicularly away from the slot 18; a ratchet dog 21 snugly confined within and slidable along the slot 19 to cause either of its opposite corners to actively cooperate with the ratchet teeth 11, the dog 21 having two adjoining conical detents 22 facing the recess 20, and also having a transverse groove 23 therein; a dog restraining and retaining ball 24 movably confined within the central recess 20 and being constantly urged toward the detents 22 by means of a compression spring 25; a plate or washer 26 coacting with a flat shoulder 27 formed on the member 15 to prevent rotation of the washer relative to the member, and having an arcuate slot 28 therein; a shifting element or ratchet reversing ring 29 carrying a pin 30 which penetrates the slot 28 and extends into the dog groove 23; a ring nut 31 coacting with a central threaded stud 32 formed integral with the member 15 and providing a journal for the reversing ring 29; a pair of actuating pins 33 piercing the casing 10 at the openings 13 and having inner roughened heads or ends 34 adapted to coact with corrugations 35 on the periphery of the ring 29; and a snap ring 36 cooperable with a groove 37 formed within the casing 10, and with a flange 38 on the member 15, to maintain the coupling unit assembled.

The polygonal socket 12 of the housing casing 10 may be provided with a latch releasing plunger 39 as shown, and this socket is formed for detachable attachment to the shank of a rotary or an oscillatory driving spindle, not shown, which will be disposed concentric with the ratchet unit during normal use thereof. The central driving socket 12 may obviously be replaced by a socket of different formation, or by a driving shank similar to the shank 16; and this shank 16 which is detachably cooperable with rotary work, may likewise be replaced by a shank of different formation, or by a socket similar to the socket 12 formed in the driven member 15. The ball latch 17 and release plunger 39 are of well known construction and operation, and the tubular or annular driving casing 10 is preferably formed of a single piece of metal having the annular series of internal teeth 11 formed integral therewith.

The one-piece driven member 15 comprises the shank 16, cylindrical medial portion 18, shoulder 27, stud 32, and flange 38; and the shoulder 27 coacts with the slotted washer 26 so as to prevent rotation thereof about the stud 32, while the flange 38 coacts with the interior of the casing 10 and with the snap ring 36 so as to permit rotation of the member 15 within the driving housing while preventing relative axial displacement of these parts. The arcuate slot 28 in the washer 26 should be made of sufficient length to avoid interfering with the reversing movement of the pin 30; and the reversing ring 29 is rotatably confined by the ring nut 31 so as to cause rotation of the ring 29 relative to the member 15, to shift the dog 21 from one operative position to the other. The ball 24 normally coacts with one of the conical detents 22 as shown in Figs. 1 and 5, and the compression spring 25 resiliently restrains the dog 21 against movement along the slot 19 in either direction. When the annular ring element 29 is rotated relative to the member 15, the ball 24 will be depressed against the spring 25, and the ball will then be transferred from one detent 22 to the other, thereby reversing the action of the ratchet mechanism.

While the periphery of the reversing ring 29 is provided with an annular series of serrations 35, this ring is constantly concealed within the casing 10, and means must therefore be provided for readily actuating the ring 29 from the exterior of the main casing. The diametrically opposite radial pins 33 which coact with the side casing openings 13, have their inner headed ends 34 knurled or otherwise roughened so that when the button pins 33 are pressed inwardly, the ring 29 will be held against rotation relative to the casing 10. If the member 15 is then rotated while the ring 29 is being held or fixed against rotation, the reversing pin 30 carried by the ring 29 will become effective to switch the dog 21 from one active position to the other. Upon release of the pins 33, the ring 29 will again be free to rotate with the driven member 15, and the enlarged end heads 34 of the pins 33 prevent these pins from falling out of the openings 13.

During normal use of the improved ratchet coupling unit or socket, the dog 21 should first be set for proper action corresponding to the desired direction of rotation, whereupon the unit may be inserted between the propelling shank of a driver and the socket of a driven element associated with the work. When the driver is subsequently oscillated to thereby likewise oscillate the main casing 10, rotative movement of the casing 10 in one direction about its central axis will cause the flat faces of the casing teeth 11 to engage the active corner of the dog 21 and will positively impart similar rotative movement to the member 15 and shank 16. When the driver and casing 10 are swung in the opposite direction, the casing teeth will force the dog 21 into the slot 19 against the resilient resistance afforded by the ball 24, and the teeth 11 will then ride over and past the dog 21 until the movement is again reversed. The concealed ring 29 may however be quickly and conveniently adjusted from the exterior of the housing casing 10, to reverse the ratchet action, and such reversal may be effected without removing the unit from the driving and driven elements. The entire assemblage may be readily removed and dismantled and may be just as readily assembled; and while the ratchet action would ordinarily be utilized, the unit may also be used as a reversing coupling for transmitting continuous rotation in either direction.

From the foregoing description it will be apparent that the present invention provides a ratchet socket or coupling unit which is extremely simple, compact and durable in construction, and in which the delicate working parts are effectively concealed and thoroughly protected. Reversal of the action of the concealed ratchet mechanism, may however be quickly and effectively accomplished with the aid of the holding pins 33, and these opposed radial pins are likewise simple in construction and highly efficient in action. The snap ring 36 provides simple and efficient means for normally maintaining the unit assembled, but for also enabling quick dismantling, and while other types of ratchet mechanisms may be utilized, the assemblage shown in my prior application is well suited for use in the improved coupling unit. The invention has proven highly satisfactory and successful in actual commercial use, and the improved ratchet units can obviously be manufactured and sold at moderate cost.

It should be understood that it is not desired to limit this invention to the exact details of construction or to the precise mode of operation, herein shown and described, for various modifications within the scope of the claims may occur to persons skilled in the art. Such modifications as the provision of two or more shoulders 27 on the member 15, or the use of a key in place of these shoulders, for preventing rotation of the washer 26; and the possible formation of the pin 30 as an integral part of the ring nut 31, are obviously within the contemplation and scope of the present improvement.

I claim:

1. In combination, a coupling casing having internal ratchet teeth and one end formed for attachment to a central driving element, a driven member confined within said casing and having its opposite end projecting exteriorly of the casing and formed for cooperation with the work, ratchet mechanism interposed between said casing teeth and said driven member and being totally enclosed thereby, a rotary annular element for reversing said mechanism and being totally concealed by and mounted entirely within said casing, and a pair of diametrically opposite radially movable pins penetrating said casing for manipulating said annular reversing element.

2. In combination, a tubular casing having an annular series of internal teeth and an end polygonally formed for attachment to a concentric rotary driving element, a driven member rotatably confined in said casing and having its opposite end polygonally formed for cooperation with the work, ratchet mechanism interposed between said casing teeth and said driven member and being concealed thereby, rotary annular means concealed by and mounted entirely within said casing for reversing said mechanism, and radially movable means fixed against rotation relative to the casing and being operable from the exterior of said casing for actuating said annular reversing means.

3. In combination, a tubular casing having an annular series of internal teeth and an end polygonally formed for attachment to a concentric rotary driving element, a driven member rotatably confined in said casing and having its opposite end polygonally formed for cooperation with the work, ratchet mechanism interposed between said casing teeth and said driven member and being concealed thereby, rotary annular means concealed by and mounted entirely within said casing for reversing said mechanism, and a pair of diametrically opposite radially movable pins penetrating said casing for manipulating said annular ratchet reversing means.

4. In combination, a cylindrical coupling casing having an end polygonally formed for concentric attachment to a driver, a driven member concentrically confined within said casing and having its opposite end polygonally formed for cooperation with rotary work, ratchet mechanism interposed between said casing and said member and being concealed thereby, rotary annular reversing means for said mechanism concealed by and confined entirely within said casing, and other means fixed against rotation relative to the casing and being operable from the exterior of said casing for actuating said reversing means.

5. In combination, a cylindrical coupling casing having an end polygonally formed for concentric attachment to a driver, a driven member concentrically confined within said casing and having its opposite end polygonally formed for cooperation with rotary work, ratchet mechanism interposed between said casing and said member and being concealed thereby, rotary annular reversing means for said mechanism concealed by and confined entirely within said casing, and a pair of diametrically opposite pins penetrating and fixed against rotation about the casing axis and being movable radially of said casing for manipulating said ratchet reversing means.

6. In combination, a cylindrical coupling casing having an end polygonally formed for concentric attachment to a driver, a driven member concentrically confined within said casing and having its opposite end polygonally formed for cooperation with rotary work, ratchet mechanism interposed between said casing and said member and being concealed thereby, a rotary circular reversing element for said mechanism concealed within said casing, and a pin piercing said casing and being cooperable with the periphery of said element to effect reversal of said ratchet mechanism.

7. In combination, a cylindrical coupling casing having an end polygonally formed for concentric attachment to a driver, a driven member concentrically confined within said casing and having its opposite end polygonally formed for cooperation with rotary work, ratchet mechanism interposed between said casing and said member and being concealed thereby, an annular reversing element for said mechanism carried by said member within said casing, and a pair of pins piercing said casing and being cooperable with diametrically opposite portions of said element to effect reversal of said ratchet mechanism.

8. In combination, a tubular casing having one end provided with a polygonal recess for detachable attachment to a driver and having an internal annular groove adjacent its opposite open end, a cylindrical driven member concentrically disposed within said casing and having a polygonal shank projecting through said open casing end for detachable cooperation with rotary work, a snap ring coacting with said groove to retain said member within said casing, ratchet mechanism interposed between said casing and said member within said casing, a rotary reversing element for said mechanism confined within said casing, and clamping pins piercing said casing and being cooperable with said concealed element to effect reversal of said mechanism.

9. In combination, a tubular casing having one end provided with a polygonal central recess for detachable attachment to a driver and having its opposite end open, a cylindrical driven member concentrically confined within said casing and having a polygonal shank projecting through said open casing end for detachable cooperation with rotary work, ratchet mechanism interposed between said casing and said member entirely within said casing, a rotary reversing element for said mechanism carried by said member within said casing, and a pair of opposed clamping pins piercing said casing between said ends and being cooperable with said concealed element to effect reversal of said mechanism.

SIEGMUND MANDL.